(12) United States Patent
Mutlu Bozay et al.

(10) Patent No.: US 10,012,241 B2
(45) Date of Patent: Jul. 3, 2018

(54) FAN ASSEMBLY FOR A REFRIGERATION APPLIANCE

(71) Applicant: ARCELIK ANONIM SIRKETI, Istanbul (TR)

(72) Inventors: Sati Mutlu Bozay, Istanbul (TR); Yigit Ozsacmaci, Istanbul (TR); Gurkan Oztop, Istanbul (TR); Altinal Caliskan, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 213 days.

(21) Appl. No.: 14/900,561

(22) PCT Filed: Jun. 20, 2013

(86) PCT No.: PCT/EP2013/062890
§ 371 (c)(1),
(2) Date: Dec. 21, 2015

(87) PCT Pub. No.: WO2014/202142
PCT Pub. Date: Dec. 24, 2014

(65) Prior Publication Data
US 2016/0146224 A1    May 26, 2016

(51) Int. Cl.
*F04D 29/64*    (2006.01)
*F04D 29/66*    (2006.01)
(Continued)

(52) U.S. Cl.
CPC ......... *F04D 29/668* (2013.01); *F04D 29/601* (2013.01); *F04D 29/64* (2013.01);
(Continued)

(58) Field of Classification Search
CPC .... F04D 29/668; F04D 29/646; F04D 29/644; H05K 7/20172; F25D 17/067;
(Continued)

(56) References Cited

U.S. PATENT DOCUMENTS 5,685,682 A * 11/1997 Glime .................. F16B 5/0225
                                                                    411/510
8,075,250 B2 * 12/2011 Zhou ...................... F04D 29/64
                                                                    24/453
(Continued)

FOREIGN PATENT DOCUMENTS

DE    29723505 U1    9/1998
DE    20320813 U1    5/2005
(Continued)

OTHER PUBLICATIONS

International Search Report of PCT/EP2013/062890 and references cited therein.
(Continued)

*Primary Examiner* — Justin Seabe
(74) *Attorney, Agent, or Firm* — Kilpatrick Townsend & Stockton LLP

(57) ABSTRACT

The present invention relates a fan assembly (1) suitable for use in a refrigeration appliance, comprising a fan system (2) including a fan frame (3) having a first opening (4) defining a first airflow path, a plurality of supporting ribs (5) extending from the fan frame (3) towards a center of the first opening (4), an axial fan (6) and a fan motor (7) for driving the axial fan (6), located within the first opening (4) and held by the plurality of supporting ribs (5). The fan assembly (1) according to the present invention further comprises an evaporator cover (8) including a second opening (9) defining a second airflow path, a support frame (10) formed around the second opening (9), for accommodating the fan system (2), a retainer frame (11) for resiliently holding the fan system (2) and for detachably engaging with the support frame (10), the retainer frame (11) including a third opening (12) defining a third airflow path, wherein the first airflow
(Continued)

Figure 1:
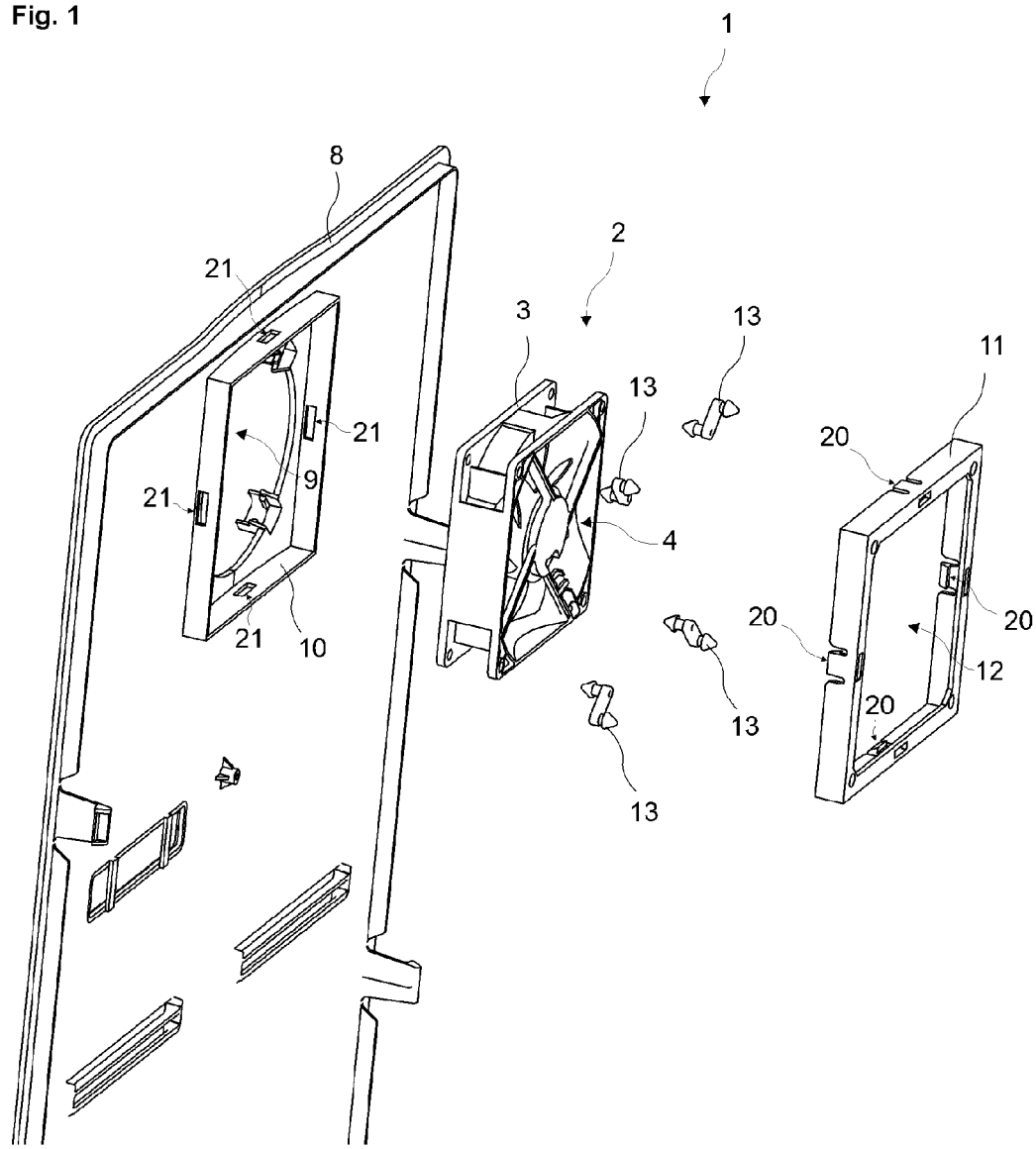

path, the second airflow path, and the third airflow path are arranged in fluid communication.

20 Claims, 9 Drawing Sheets

(51) Int. Cl.
  *F16F 15/08* (2006.01)
  *F16F 1/373* (2006.01)
  *F25D 17/06* (2006.01)
  *G06F 1/20* (2006.01)
  *F04D 29/60* (2006.01)
  *F25D 23/00* (2006.01)

(52) U.S. Cl.
  CPC .............. *F16F 1/373* (2013.01); *F16F 15/08* (2013.01); *F25D 17/067* (2013.01); *F25D 23/006* (2013.01); *G06F 1/20* (2013.01); *F25D 2317/0681* (2013.01)

(58) Field of Classification Search
  CPC .... F25D 17/062; F16B 21/082; F16B 21/086; F16B 5/065; F16B 5/0642; F16B 5/0657
  See application file for complete search history.

(56) References Cited

U.S. PATENT DOCUMENTS

2005/0173997 A1  8/2005  Schmid et al.
2007/0155301 A1  7/2007  Chen

FOREIGN PATENT DOCUMENTS

| | | |
|---|---|---|
| JP | H05167280 A | 7/1993 |
| JP | 2009252843 A | 10/2009 |
| JP | 2010267751 A | 11/2010 |
| WO | 2011009784 A2 | 1/2011 |

OTHER PUBLICATIONS

Complex Elastic Fasterner, IBM Tech. Disc. Bull., Int. Busn. Mach. Corp. (Thornwood), U.S., vol. 34, No. 8, Jan. 1, 1992, pp. 61-63 (see international search report).

Fan Vibration Isolator, IBM Tech. Disc. Bull., Int. Busn. Mach. Corp. (Thornwood), U.S., vol. 33, No. 18, Jun. 1, 1990, pp. 197-198 (see international search report).

* cited by examiner

FAN ASSEMBLY FOR A REFRIGERATION APPLIANCE

The present invention relates to a fan assembly for use in a refrigeration appliance, in particular a domestic no-frost refrigerator, and a refrigeration appliance having the fan assembly.

The "no-frost" technology constitutes an effective method of reducing humidity in a refrigeration compartment to prevent formation of frost on the articles stored therein as well as on the inner walls thereof. A refrigeration appliance utilizing the no-frost technology typically includes a compartment for accommodating the articles to be refrigerated, an evaporator which is disposed at a location outside the refrigerating compartment and a circulation duct for conveying the air in the refrigerating compartment to the evaporator by means of a fan system and for subsequently discharging the air into the refrigerating compartment. Thereby, heat is transferred from the articles stored in the refrigerating compartment to the evaporator through convection which is forced by the fan system. The moisture in the circulated air freezes on the surface of the evaporator as the air cools down. Therefore, the surface of the evaporator must be eventually defrosted at predetermined intervals.

The refrigeration performance of a no-frost refrigeration appliance depends on several factors. For instance, a cooling rate of the articles will be a function of the amount of air conveyed to the evaporator. Whereas the amount of the air conveyed to the evaporator is influenced by a rotation-speed of the axial fan of the fan system. The rotation-speed of the axial fan must be sufficiently high for achieving a desired inner temperature in the refrigerating compartment. However, the fan system generates vibrations as the rotation-speed is increased. Consequently, the installation place of the refrigeration appliance can easily become very noisy and jeopardize a customer's living comfort. Hence, the vibrations of the fan system must be effectively damped to safeguard silent operation of the refrigeration appliance.

Several techniques for damping vibrations generated by a fan system have been devised. A commonly used method for damping the vibrations is to provide a resilient member which isolates the fan system from the other parts of a fan assembly comprising the fan system.

WO 2011/009784 A2 discloses a fan assembly for use in a refrigeration appliance. The fan assembly disclosed therein comprises a fan system including a fan frame, a fan motor and an axial fan which is mounted in an air passage of the fan frame and driven by the fan motor. The fan assembly further comprises a housing which encloses the fan frame on two opposite sides and a plurality of elastic buffer elements which are clamped into the gaps between the sides of the fan frame and the inner surfaces of the housing which oppose said sides. The housing is mounted on an air passage of a cover which separates the evaporator from the refrigerating compartment.

If the elastic buffer elements interposed between the fan system and the housing are compressed too strongly, the vibrations are transmitted to the cover without being sufficiently diminished. On the contrary, if the compression is too weak, the fan system produces so-called "kicks" which deteriorate an overall operation performance.

An objective of the present invention is to provide a fan assembly for use in a refrigeration appliance, and a refrigeration appliance having the same which overcomes the aforementioned problems, and which can be cost-effectively produced and easily mounted, and which enables effective damping of the vibrations generated by a fan system even when it is operated at relatively high rotational-speeds.

This objective has been achieved by the fan assembly according to the present invention as defined in claim 1, and the refrigeration appliance as defined in claim 14. Further achievements are attained by the subject-matters respectively defined in the dependent claims.

The fan assembly according to the present invention comprises a fan system including a fan frame having a first opening defining a first airflow path, a plurality of supporting ribs extending from the fan frame towards a center of the first opening, an axial fan and a fan motor for driving the axial fan located within the first opening and held by the plurality of supporting ribs, an evaporator cover including a second opening defining a second airflow path, a support frame formed around the second opening for accommodating the fan system, a retainer frame for resiliently holding the fan system and for detachably engaging with the support frame, the retainer frame including a third opening defining a third airflow path, wherein the first airflow path, the second airflow path, and the third airflow path are arranged in fluid communication and four resilient connecting elements each including a first projecting portion and a second projecting portion for detachably engaging respectively with one of four through holes formed on the fan frame and a respective one of four through holes formed on the retainer frame, wherein the four connecting elements are arranged planarly. The plane, which is constituting by the connecting elements, perpendicular to the axial direction of the axial fan. The connecting elements provide mounting of the fan system to the retainer frame by hanging the fan system in the middle of the retainer frame and resiliently holding the fan system by the retainer frame with the support frame on the evaporator cover. Thereby, the fan system is held in a suspension state in the middle of the retainer frame rather than a compression state. The vibrations are almost entirely absorbed and only faintly transmitted to the retainer frame. The kick formation is prevented and normal operation performance is sustained.

In an embodiment, each resilient connecting element has a stem portion. The stem portion has a predetermined length and extends, in an assembled state, in a radial direction of the axial fan. The two projecting portions are respectively formed at opposite ends of the stem portion. The projecting portions extend parallel to each other. In an assembled state, the projecting portions extend parallel to an axial direction of the axial fan. The fan frame can be easily mounted onto the retainer frame by using the connecting to obtain an assembly group which includes the fan system and the retainer frame. The assembly group is subsequently mounted onto the support frame by using the retainer frame.

In an embodiment, the retainer frame has a plurality of snap-fit portions for resiliently and detachably engaging with a respective detent formed on the support frame. Thereby, the aforementioned assembly group can be easily mounted onto the support frame by an engagement of the snap-fit portions and the detents.

In an embodiment, the support frame is integrally formed with the evaporator cover. Thereby, the overall structure of the fan assembly is substantially simplified. The constituent parts of the fan assembly can be easily assembled in a few steps by using a plurality of connecting elements.

Additional advantages of the fan assembly of the present invention will now become apparent with the detailed description of an embodiment with reference to the accompanying drawings in which:

FIG. 1—is an exploded perspective view of a fan assembly according to the present invention.

Figure 2:
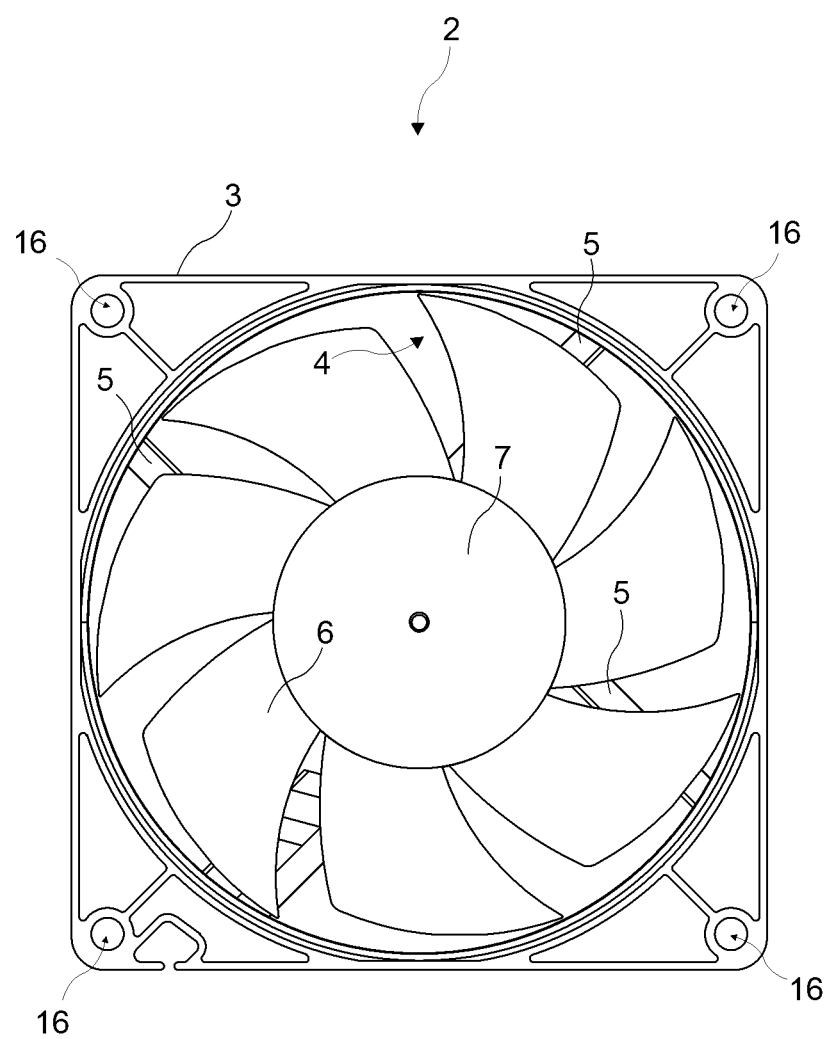

FIG. 2—is a front view of a fan system according to the present invention.

Figure 3:
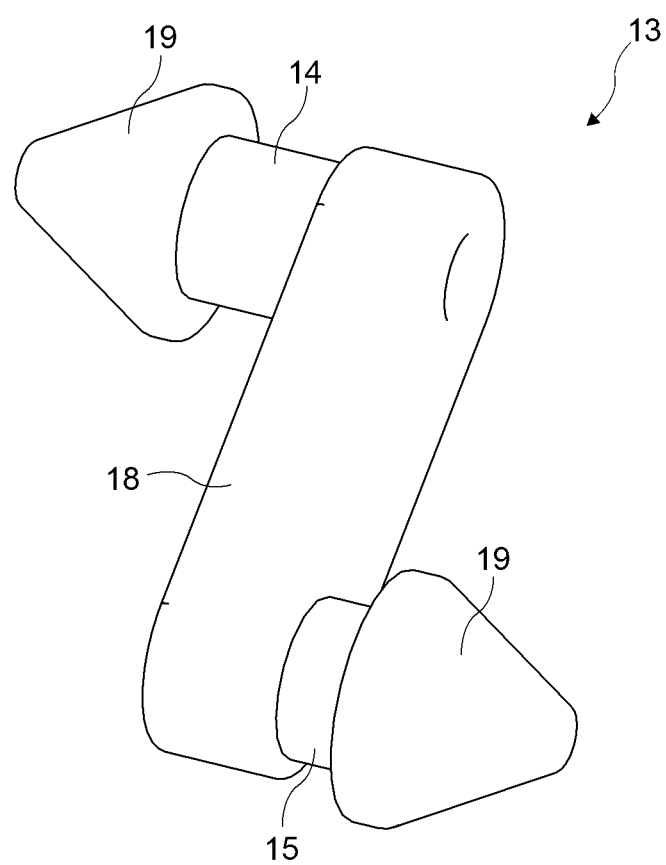

FIG. 3—is a perspective view of a connecting element according to the present invention.

Figure 4:
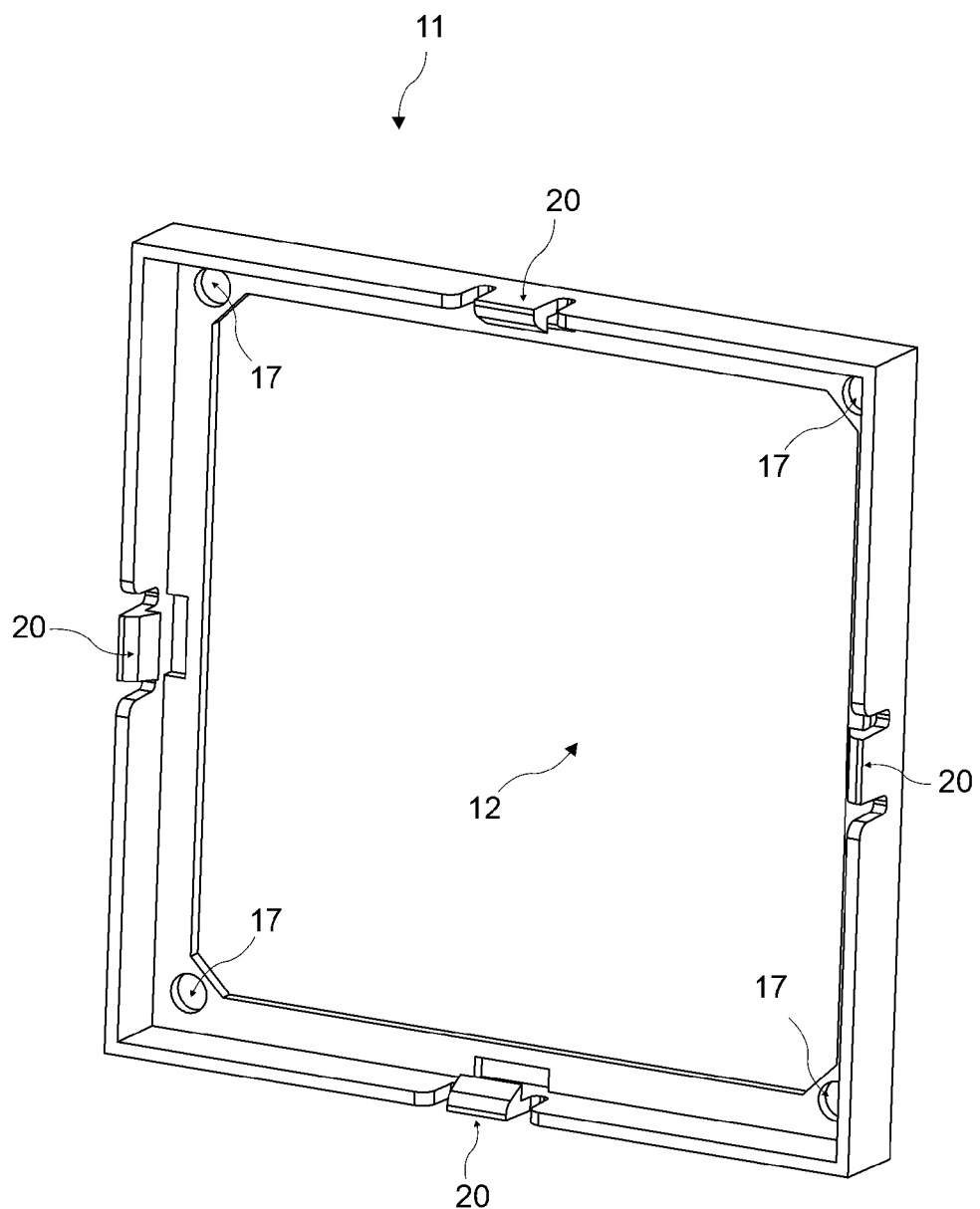

FIG. 4—is a perspective view of a retainer frame according to the present invention.

Figure 5:
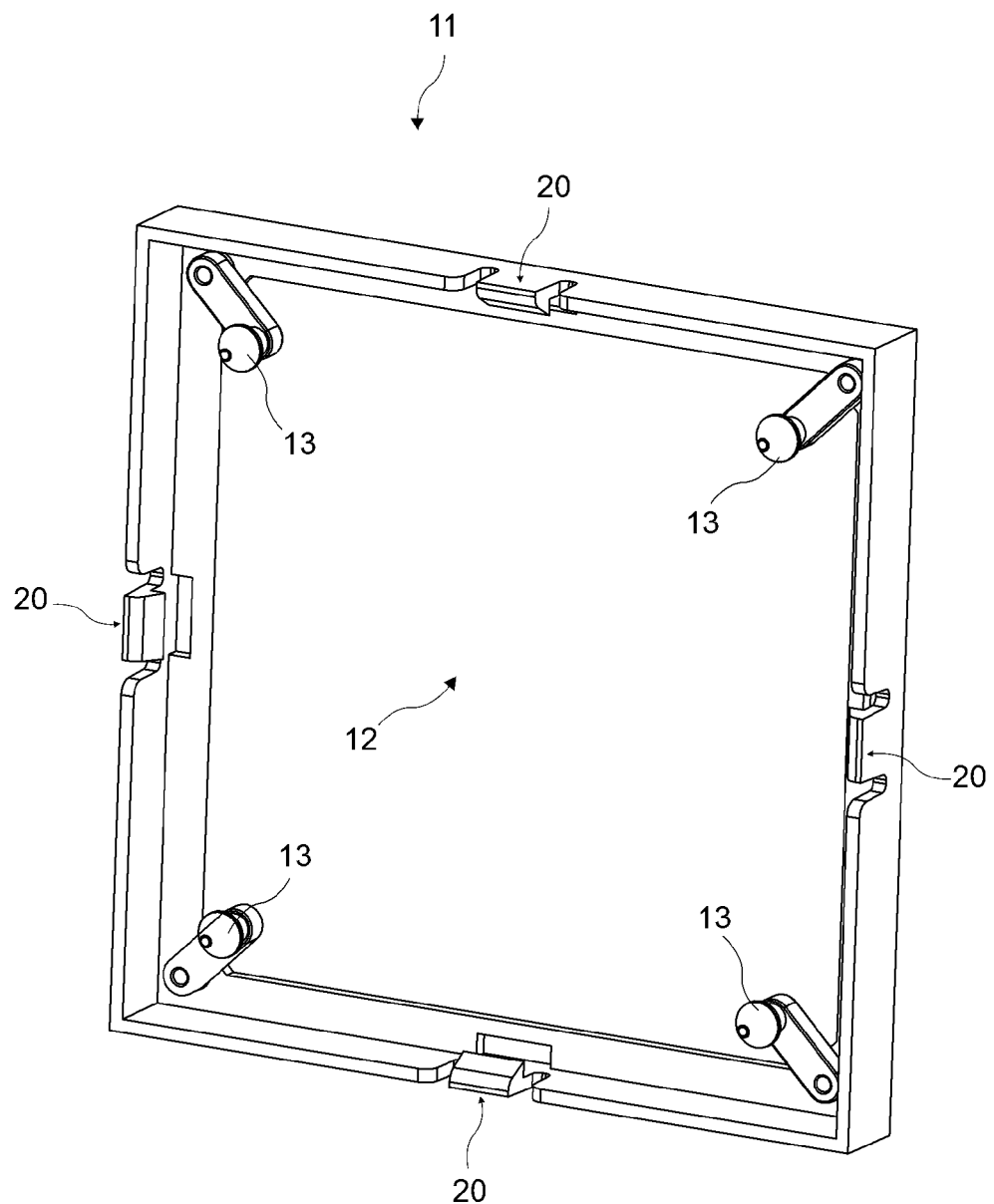

FIG. 5—is a perspective view of the retainer frame engaged with connecting elements.

Figure 6:
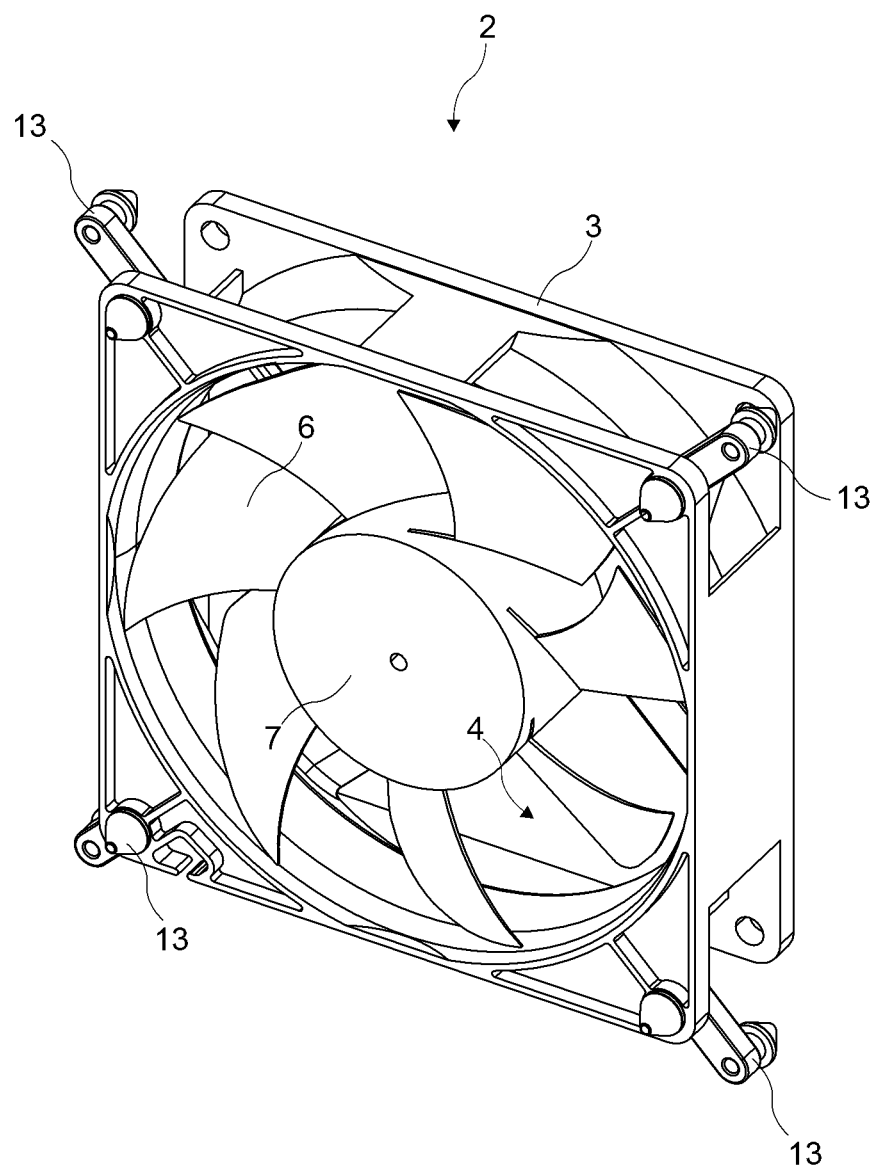

FIG. 6—is a schematic perspective view of the fan system engaged with connecting elements each as shown in FIG. 3.

Figure 7:
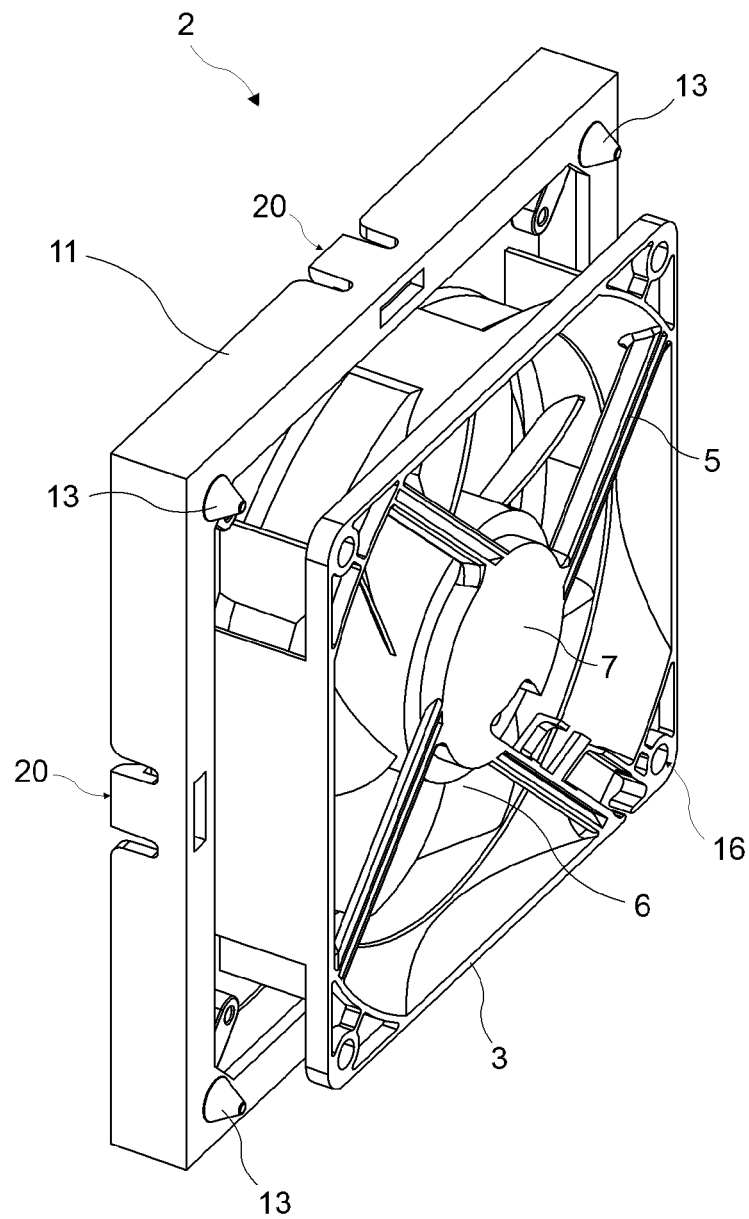

FIG. 7—is a perspective view of the fan system assembled with the retainer frame using connecting elements.

Figure 8:
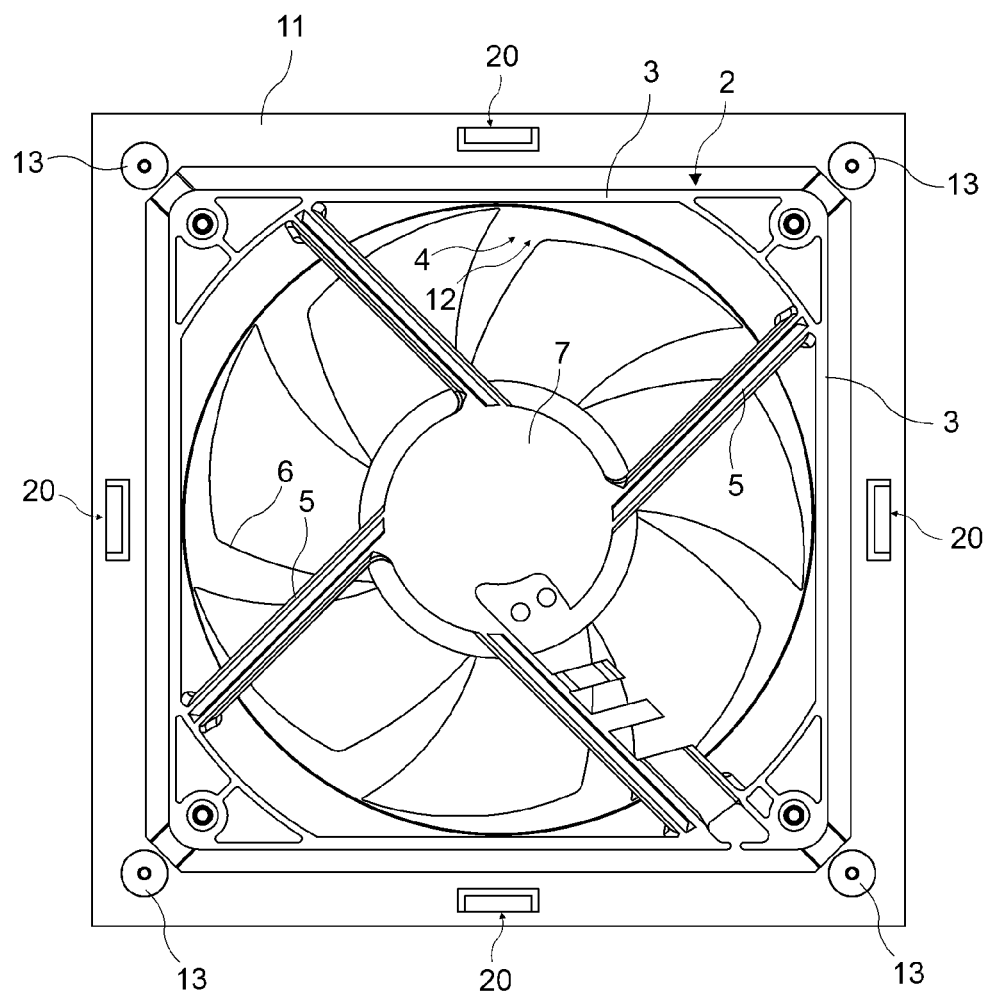

FIG. 8—is a rear view of the fan assembly group.

Figure 9:
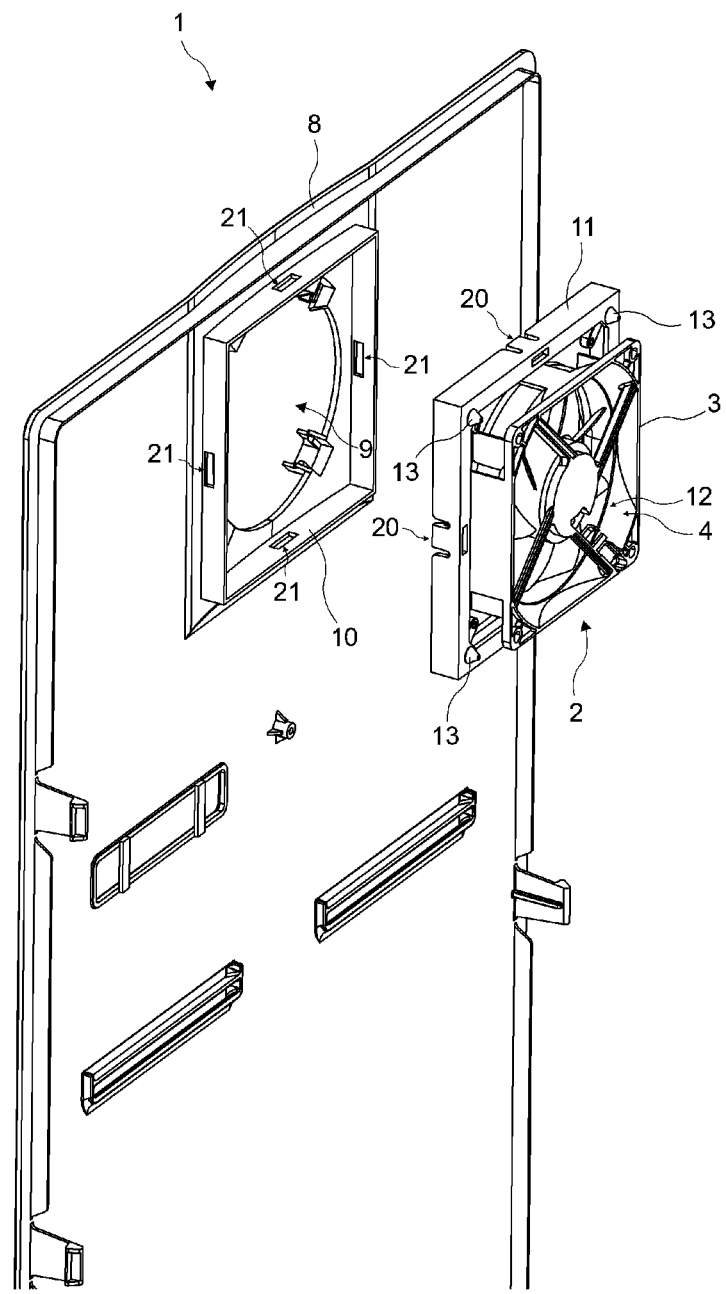

FIG. 9—is an exploded perspective view of the fan assembly wherein the fan assembly group is mounted onto the evaporator cover.

The reference signs appearing on the drawings relate to the following technical features:
1. Fan assembly
2. Fan system
3. Fan frame
4. First opening
5. Supporting rib
6. Axial fan
7. Fan motor
8. Evaporator cover
9. Second opening
10. Support frame
11. Retainer frame
12. Third opening
13. Connecting element
14. First projecting portion
15. Second projecting portion
16. Through hole (in fan frame)
17. Through hole (in retainer frame)
18. Stem portion
19. Catch portion
20. Snap-fit portion
21. Detent The fan assembly (1) is suitable for use in a refrigeration appliance. The fan assembly (1) comprises a fan system (2) including a fan frame (3) having a first opening (4) defining a first airflow path, a plurality of supporting ribs (5) extending from the fan frame (3) towards a center of the first opening (4), an axial fan (6) and a fan motor (7) for driving the axial fan (6), located within the first opening (4) and held by the plurality of supporting ribs (5), an evaporator cover (8) including a second opening (9) defining a second airflow path, a support frame (10) formed around the second opening (9), for accommodating the fan system (2), a retainer frame (11) for holding the fan system (2) and for detachably engaging the fan system (2) with the support frame (10) on the evaporator cover (8). The retainer frame (11) including a third opening (12) defining a third airflow path, wherein the first airflow path, the second airflow path, and the third airflow path are arranged in fluid communication.

The fan assembly (1) according to the present invention comprises plurality of resilient connecting elements (13) attached to the fan frame (3) and the retainer frame (11). The connecting elements (13) provide mounting of the fan system (2) to the retainer frame (11) by suspending and resiliently holding the fan system (2) in the middle of the retainer frame (11). The plurality of connecting elements (13) arranged on a plane which is perpendicular to the axial direction of the axial fan (6).

In an embodiment of the present invention, the fan assembly (1) comprises four connecting elements (13), four through holes (16) on the corners of the fan frame (3) and four through holes (17) on the corners of the retainer frame (11) for attaching the connecting elements (13) to the fan frame (3) and the retainer frame (11).

The connecting element (13) comprises a first projecting portion (14) and a second projecting portion (15) for detachably engaging respectively with one of four through holes (16) formed on the fan frame (3) and a respective one of four through holes (17) formed on the retainer frame (11) (FIG. 2, FIG. 3, FIG. 4). The four connecting elements (13) are arranged on a plane which is perpendicular to the axial direction of the axial fan (6).

In another embodiment of the present invention, each resilient connecting element (13) has a stem portion (18) having a predetermined length, extending in a radial direction of the axial fan (6) (FIG. 3). The first projecting portion (14) and the second projection portion (15) are respectively formed at opposite ends of the stem portion (18) and extend parallel to each other in the axial direction of the axial fan (6) (FIGS. 3 and 5).

In another embodiment of the present invention, the first projecting portion (14) and the second projecting portion (15) mutually extend in opposite directions in the axial direction of the axial fan (6) (FIG. 5 and FIG. 6).

In another embodiment of the present invention, each of the first projecting portion (14) and the second projecting portion (15) has a catch portion (19) having a mushroom shape which engages with a respective through hole (16, 17) (FIG. 3).

In another embodiment of the present invention, the first projecting portion (14) and the second projecting portion (15) are identical in shape (FIG. 3). The first projecting portion (14) and the second projecting portion (15) each has a circular cross section which forms an undercut at the catch portion (19). Thereby, the connecting elements (13) firmly engage with the through holes (16, 17) (FIGS. 3, 5, and 6).

In another embodiment of the present invention, the connecting elements (13) are made of silicone material.

In another embodiment of the present invention, the retainer frame (11) has a plurality of snap-fit portions (20) for resiliently and detachably engaging with a respective detent (21) formed on the support frame (10) (FIG. 1).

In another embodiment of the present invention, the retainer frame (11) has four snap-fit portions (20). One snap-fit portions (20) is formed on each side of the retainer frame (11) (FIG. 4). The support frame (10) has four respective detents (21). One detent (21) is formed on each side of the support frame (10). The snap-fit portions (20) and the detents (21) are respectively arranged on the retainer frame (11) and the support frame (10) so as to oppose each other (FIG. 1, FIG. 9).

In another embodiment of the present invention, the support frame (10) is integrally formed with the evaporator cover (8) (FIG. 1, FIG. 9).

In another embodiment of the present invention, the fan frame (3), the support frame (10), and the retainer frame (11) each has a rectangular outline, in particular a square outline. The fan frame (3), the support frame (10), and the retainer frame (11) each defines a plane which is perpendicular to the axial direction of the axial fan (6). The geometrical centers of the support frame (10), the fan frame (3), and the retainer frame (11) are arranged, in the given order, on a line coinciding with the axial direction of the axial fan (6). Both the support frame (10) and the retainer frame (11) surround the fan frame (3) on all lateral sides thereof. Both the support frame (10) and the retainer frame (11) have lateral walls which configure a frame structure. The walls extend parallel to an axial direction of the axial fan (6).

In another embodiment of the present invention, one through hole (16, 17) is respectively formed at each corner of the fan frame (3) and the retainer frame (11) (FIG. 2, FIG. 4). The fan frame (3) and the retainer frame (11) are resiliently and detachably engaged to the support frame (10) of the evaporator cover (8) by four connecting elements (13). The connecting elements (13) connect the corners of the fan frame (3) to the corners of the retainer frame (11) (FIG. 5, FIG. 6).

In another embodiment of the present invention, each stem portion (18) extends in a diagonal direction of the retainer frame (11) (FIG. 8).

The refrigeration appliance (not shown) according to the present invention comprises the fan assembly (1). By virtue of the resilient connecting elements (13), the fan assembly (1) can be installed into the refrigeration appliance in a horizontal arrangement as well as in a vertical arrangement of the fan system (2). In either arrangement, the fan system (2) is firmly held by the connecting elements (13) in a suspension state. Thus, the fan assembly (1) is suitable for installation at any alignment of the axial direction of the axial fan (6).

Next, a method of assembling the constituent parts of the fan assembly (1) will be explained.

First, the fan system (2) is mounted onto the retainer frame (11) by engaging the through holes (16) formed on the fan frame (3) and the respective through holes (17) formed on the retainer frame (11) with the plurality of resilient connecting elements (13) to obtain an assembly group (FIGS. 3, 4, 6, and 7).

Then, the assembly group is mounted onto the evaporator cover (8) by engaging the retainer frame (11) with the support frame (10) by using the snap-fit portions (20) and the detents (21) (FIG. 9).

Then, the fan assembly (1) is installed into the refrigeration appliance (not shown) by mounting the evaporator cover (8) at its designated place. The fan system (2) has a port for electrical connection to supply the motor (7) with electrical current (FIG. 8).

The present invention proposes the fan system (2) wherein the fan frame (3) including the axial fan (6) is hanged to the retainer frame (11) from the corners means of the connecting elements (13) in a resilient manner and the fan system (2) is detachably attached to the support frame (10) on the evaporator cover (8). The connecting elements (13) reduce the noise created by the axial fan (6) reduced by means of the resilient connecting elements (13) effectively in a refrigeration appliance.

The invention claimed is:

1. A fan assembly suitable for use in a refrigeration appliance, the fan assembly comprising:
   a fan system including:
      a fan frame,
      a plurality of supporting ribs,
      an axial fan, and
      a fan motor for driving the axial fan and held by the plurality of supporting ribs,
   an evaporator cover including a support frame for accommodating the fan system, and
   a retainer frame for holding the fan system and for detachably engaging the fan system with the support frame on the evaporator cover, wherein a plurality of resilient connecting elements are attached to the fan frame and the retainer frame, the plurality of resilient connecting elements providing mounting of the fan system to the retainer frame by suspending and resiliently holding the fan system in a middle of the retainer frame, wherein the plurality of resilient connecting elements are arranged on a plane which is perpendicular to an axial direction of the axial fan, wherein each of the plurality of resilient connecting elements includes a first portion and a second portion, the first portion extending along a first direction, the second portion extending along a second direction, wherein the first direction is offset from and parallel to the second direction, and wherein the first direction and the second direction are parallel to the axial direction of the axial fan.

2. The fan assembly according to claim 1, wherein four fan through holes are formed on corners of the fan frame, wherein four retainer through holes are formed on the corners of the retainer frame, wherein the plurality of resilient connecting elements include four resilient connecting elements that are each configured to be attached to the fan frame and the retainer frame, wherein the first portion and the second portion are for detachably engaging respectively with one of four fan through holes and a respective one of four retainer through holes.

3. The fan assembly according to claim 1, wherein each of the plurality of resilient connecting elements has a stem portion having a predetermined length, extending in a radial direction of the axial fan, and wherein the first portion and the second portion are respectively formed at opposite ends of the stem portion and extend parallel to each other in the axial direction of the axial fan.

4. The fan assembly according to claim 1, wherein the first portion and the second portion extend in opposite directions in the axial direction of the axial fan.

5. The fan assembly according to claim 1, wherein each of the first portion and the second portion has a catch portion having a mushroom shape which engages with a respective through hole.

6. The fan assembly according to claim 1, wherein the first portion and the second portion are identical in shape.

7. The fan assembly according to claim 1, wherein the plurality of resilient connecting elements are made of silicone material.

8. The fan assembly according to claim 1, wherein the retainer frame has a plurality of snap-fit portions for resiliently and detachably engaging with a respective detent formed on the support frame.

9. The fan assembly according to claim 1, wherein the retainer frame has four snap-fit portions and in that the support frame has four respective detents, and wherein the snap-fit portions and the detents are respectively arranged on the retainer frame and the support frame so as to oppose each other.

10. The fan assembly according to claim 1, wherein the support frame is integrally formed with the evaporator cover.

11. The fan assembly according to claim 1, wherein the fan frame, the support frame, and the retainer frame each has a square outline.

12. The fan assembly according to claim 1, wherein a through hole is respectively formed at each corner of the fan frame and the retainer frame and in that the fan frame and the retainer frame are resiliently and detachably engaged from their corners by the plurality of resilient connecting elements.

13. The fan assembly according to claim 3, wherein the stem portion extends in a diagonal direction of the retainer frame.

14. A refrigeration appliance comprising:
a fan system comprising:
a fan frame,
a plurality of supporting ribs,
an axial fan, and
a fan motor for driving the axial fan and held by the plurality of supporting ribs,
an evaporator cover including a support frame for accommodating the fan system, and
a retainer frame for holding the fan system and for detachably engaging the fan system with the support frame on the evaporator cover, wherein a plurality of resilient connecting elements are attached to the fan frame and the retainer frame, the plurality of resilient connecting elements providing mounting of the fan system to the retainer frame by suspending and resiliently holding the fan system in a middle of the retainer frame, wherein the plurality of resilient connecting elements are arranged on a plane which is perpendicular to an axial direction of the axial fan, wherein a resilient connecting element includes a first portion and a second portion, the first portion extending along a first direction, the second portion extending along a second direction, wherein the first direction is offset from and parallel to the second direction, and wherein the first direction and the second direction are parallel to the axial direction of the axial fan.

15. The refrigeration appliance according to claim 14, wherein the resilient connecting element has a stem portion having a predetermined length, extending in a radial direction of the axial fan and in that the first portion and the second portion are respectively formed at opposite ends of the stem portion and extend parallel to each other in the axial direction of the axial fan.

16. The refrigeration appliance according to claim 14, wherein the first portion and the second portion extend in opposite directions in the axial direction of the axial fan.

17. The refrigeration appliance according to claim 14, wherein each of the first portion and the second portion has a catch portion having a mushroom shape which engages with a respective through hole.

18. The refrigeration appliance according to claim 14, wherein the first portion and the second portion are identical in shape.

19. The refrigeration appliance according to claim 14, wherein each of the plurality of resilient connecting elements are made of silicone material.

20. The refrigeration appliance according to claim 14, wherein the retainer frame has a plurality of snap-fit portions for resiliently and detachably engaging with a respective detent formed on the support frame.

* * * * *